March 20, 1934.  E. KLEMPERER  1,951,422
ANATOMICAL MODEL
Filed Oct. 29, 1931

INVENTOR
EDITH KLEMPERER
BY
Richards & Geier
ATTORNEYS

Patented Mar. 20, 1934

1,951,422

UNITED STATES PATENT OFFICE 1,951,422

ANATOMICAL MODEL

Edith Klemperer, Vienna, Austria

Application October 29, 1931, Serial No. 571,709
In Austria November 4, 1930

2 Claims. (Cl. 35—16)

This invention relates to a new and improved type of anatomical model for purposes of instruction which is three-dimensional and correctly proportioned, and which at the same time is capable of illustrating in a particularly clear and realistic manner the different parts of the human and animal organisms, and more particularly the functions and arrangement of the nerve tracks and nerve centres.

With this object in view, the individual parts of the model, corresponding to the anatomical details of the body or portion of a body to be represented, are made up of luminous tubes or small strip-like lamps or the like juxtaposed as required, and are arranged to be selectively illuminated by means of one or more sources of light appropriately placed and controlled. For this latter purpose, the individual parts can, for example, be so constructed, by being made reflective, that is formed of glass rods or the like, that they can be made luminous at will by the influence of an extraneous source of light suitably placed.

As a further development of the principle and purpose of this invention, functionally associated parts in the model, e. g. nerve tracts, can be luminously represented in the same colour. Further, all the individual parts can be rendered luminous or be illuminated separately, so as to be sharply contrasted in colour from the remainder, for their clearer illustration. In simpler models it is often sufficient if several parts are illuminated in the same colour. In more complicated cases it is possible to subdivide these nerve tracts and other intricate parts, and to arrange for their partial or total illumination at will.

It becomes possible in this manner to demonstrate not only the physiological course of tracts and reflexes, but also pathological processes such as the development of a hæmorrhage, or a tumor with its attendant symptoms, or the like.

The invention will appear more clearly from the following detailed description when taken in connection with the accompanying drawing, showing a preferred embodiment of the inventive idea.

Figure 1:
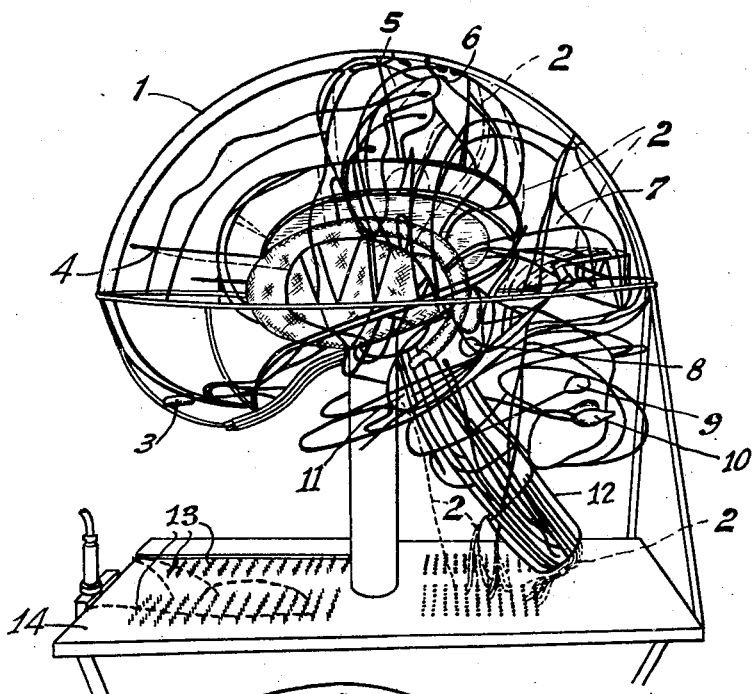
Figure 1 shows in perspective an anatomical model constructed in accordance with the principles of this invention.
Figure 2:
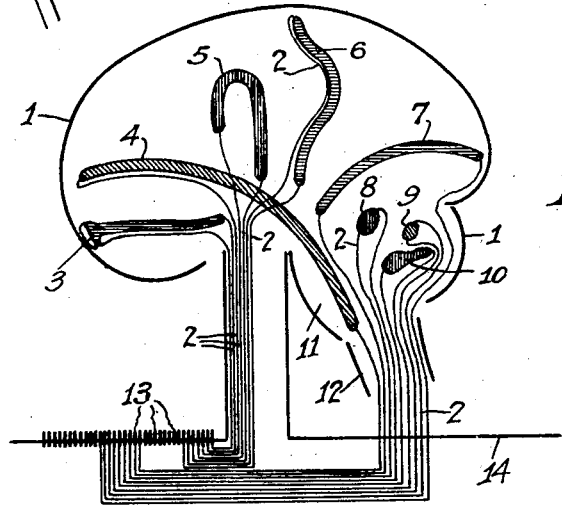
Figure 2 shows diagrammatically and on a larger scale some of the tubes and wiring forming a part of the model illustrated in Figure 1.

The model of a brain illustrated in Figures 1 and 2 of the drawing comprises a framework 1 which consists of a few metallic members suitably shaped and related to each other to suggest a brain in three dimensions. The wires 2 lead from switches 13 which are carried by a supporting table 14, to a number of luminous tubes which represent the bulbus olfactorius 3, frontopontine 4, motor nerve 5, sensory nerve 6, optic radiation of Gratiolet 7, the nucleus ruber 8, the nucleus fastigii 9, the nucleus dentatus 10, the pons 11 and the medulla oblongata 12. The model shows the medulla, the corpus callosum, the brain nerves and other important parts of the brain in their correct proportions.

It will be clear from the above description that the greater the number of contacts which there are in connection with the model the more details can be demonstrated separately in the manner indicated. The contacts themselves are preferably arranged on a separate switch board and suitably numbered or marked, to facilitate operation.

It is further possible, through variation of the intensity of the illumination (e. g. by the interposition of adjustable resistances) to obtain a still more effective demonstration of the functions of the separate tracts and the like. The illumination is preferably effected in the colours usually selected in the illustrations to medical works for the representation of the anatomical parts and details concerned.

Since the model according to the invention requires but very few supporting members, which are preferably made of metal, a particularly clear and comprehensive view of all the parts is ensured, and at the same time the possibility is provided of altering or adding to the finished model, to conform to individual needs or to the results of scientific research.

It is also possible, for example in connection with a model of the brain, either to leave the gyri and sulci unilluminated, so as to contrast with their surroundings, or to arrange for their illumination like the nerve tracts, or to coat them with coloured luminous substances so that they continue to be luminous after the electrically luminous and illuminated parts have been switched off. Which of these alternatives is actually employed in any one instance depends entirely upon the purpose for which the model is to be used.

I claim:—

1. An anatomical model consisting of a plurality of parts combining to form said model, at least some of said parts being light-producing elements.

2. An anatomical model consisting of a plurality of parts combining to form said model, at least some of said parts producing light rays of different colors, light rays of the same color being produced by functionally associated parts of the model, and means for controlling the light radiation of said parts.

EDITH KLEMPERER.